United States Patent
Jhang et al.

(10) Patent No.: US 12,196,975 B2
(45) Date of Patent: Jan. 14, 2025

(54) HEAD-MOUNTED DISPLAY DEVICE

(71) Applicant: HTC Corporation, Taoyuan (TW)

(72) Inventors: Jhih-Ming Jhang, Taoyuan (TW); Wei-Cheng Liu, Taoyuan (TW); Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/488,043

(22) Filed: Oct. 17, 2023

(65) Prior Publication Data
US 2024/0272441 A1    Aug. 15, 2024

Related U.S. Application Data

(60) Provisional application No. 63/444,561, filed on Feb. 10, 2023.

(51) Int. Cl.
*G02B 27/01* (2006.01)
(52) U.S. Cl.
CPC .. *G02B 27/0176* (2013.01); *G02B 2027/0154* (2013.01); *G02B 2027/0178* (2013.01)
(58) Field of Classification Search
CPC .......... G02B 27/0176; G02B 27/0154
See application file for complete search history.

(56) References Cited

U.S. PATENT DOCUMENTS 11,194,164 B2   12/2021   Ho et al.
2020/0371364 A1*  11/2020   Kamakura ......... G02B 27/0176

* cited by examiner

*Primary Examiner* — Sardis F Azongha
(74) *Attorney, Agent, or Firm* — JCIPRNET (57) ABSTRACT

A head-mounted display device includes a display, two brackets, two buckles, and a headband module. The display has two buckling parts respectively located on opposite sides of the display. The brackets are respectively pivotally connected to opposite sides of the display. The buckles are respectively pivotally connected to the brackets. When the buckles are buckled onto the buckling parts, an unfolding angle of each bracket is limited to be greater than a locked angle. When the unfolding angle of each bracket is greater than an unlocked angle, the buckles are separated from the buckling parts. The unlocked angle is greater than the locked angle. When the buckles are separated from the buckling parts, the unfolding angle of each bracket is smaller than the locked angle. Opposite sides of the headband module are respectively detachably assembled to an end of each bracket away from the display.

10 Claims, 11 Drawing Sheets

HEAD-MOUNTED DISPLAY DEVICE

CROSS-REFERENCE TO RELATED APPLICATION

This application claims the priority benefit of U.S. provisional application Ser. No. 63/444,561, filed on Feb. 10, 2023. The entirety of the above-mentioned patent application is hereby incorporated by reference herein and made a part of this specification.

TECHNICAL FIELD

The application relates to a display device, and in particular to a head-mounted display device.

DESCRIPTION OF RELATED ART

As the technology industry becomes increasingly developed, the types, usage functions, and usage manners of display devices are becoming more and more diverse, and wearable display devices that may be directly worn on the body of the user have also emerged accordingly. There are many types of head-mounted display devices. Taking the glasses-type head-mounted display device as an example, after the user wears this type of display device, in addition to seeing three-dimensional images, the images also change as the head of the user rotates, which can provide the user with a more immersive experience.

However, when the user plays a game and moves too vigorously, the temples cannot provide sufficient clamping force, thereby increasing the risk of the glasses-type head-mounted display device falling. In order to prevent the risk of the head-mounted display device falling, the existing technology provides a headband module to connect the two temples, so that the entire head-mounted display device may be firmly sleeved onto the head of the user. However, when the headband module is connected, the unfolding angles of the two temples are greater than when the headband module is not connected. After the headband module is removed, the two temples may be deformed due to long-term force, making it difficult to tightly clamp the head of the user.

SUMMARY

The application provides a head-mounted display device, which can reduce deformation of temples by force.

The head-mounted display device of the application includes a display, two brackets, two buckles, and a headband module. The display has two buckling parts respectively located on opposite sides of the display. The two brackets are respectively pivotally connected to the opposite sides of the display. The two buckles are respectively pivotally connected to the two brackets. When the two buckles are buckled onto the two buckling parts, an unfolding angle of each of the two brackets is limited to be greater than a locked angle. When the unfolding angle of each of the two brackets is greater than an unlocked angle, the two buckles are separated from the two buckling parts. The unlocked angle is greater than the locked angle. When the two buckles are separated from the two buckling parts, the unfolding angle of each of the two brackets may be smaller than the locked angle. Opposite sides of the headband module are respectively detachably assembled to an end of each bracket away from the display.

Based on the above, in the head-mounted display device of the application, the unfolding angle of each of the two brackets may be limited to be greater than the locked angle to prevent the brackets from being deformed by continuous excessive pressure, and the lock may also be released by simply unfolding the brackets.

DESCRIPTION OF THE EMBODIMENTS

Figure 1:
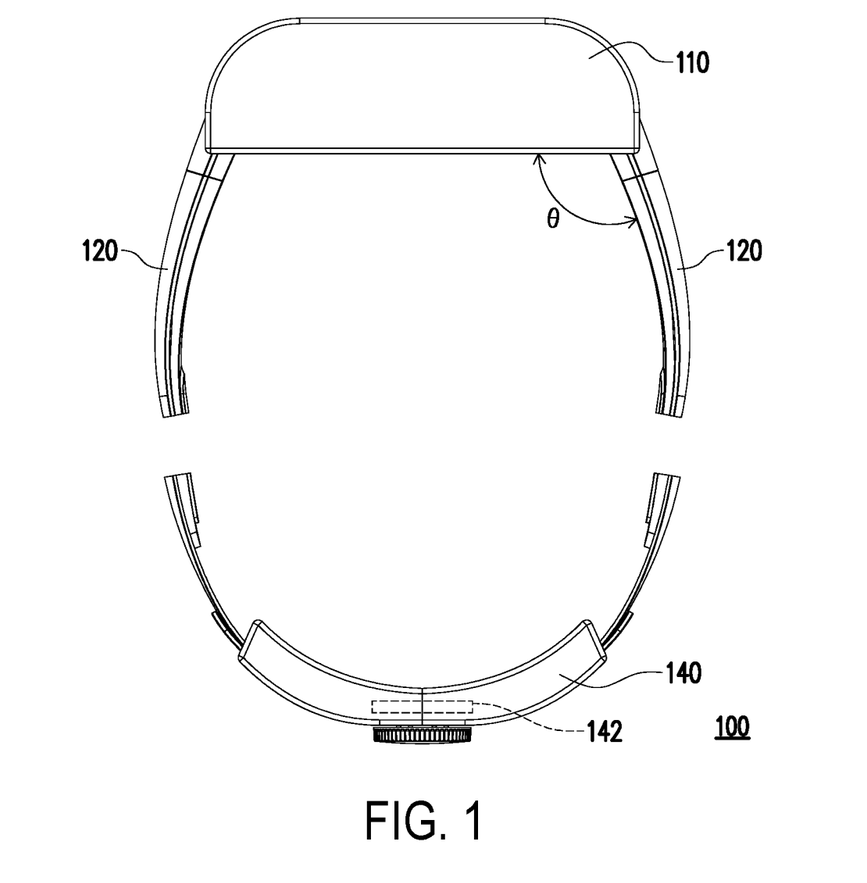
FIG. 1 is a schematic diagram of a head-mounted display device in a first state according to an embodiment of the invention.

FIG. 1 is a schematic diagram of a head-mounted display device in a first state according to an embodiment of the invention. Please refer to FIG. 1. A head-mounted display device 100 of the embodiment includes a display 110, two brackets 120, two buckles 130, and a headband module 140. The two brackets 120 are respectively pivotally connected to opposite sides of the display 110. The buckles 130 of the embodiment are hidden in a casing of the display 110, so the buckles 130 cannot be seen in FIG. 1 and will be shown in other drawings later.

In the embodiment, the display 110 is a head-mounted display and may be, for example, applied to a field such as a virtual reality system, an augmented reality system, and a mixed reality system. The display 110 may include components such as an optical system and a protective casing, which may be provided with a display or adapted to place the display. The display may be a built-in display or an external portable display (for example, a smart phone, etc.), but the application is not limited thereto. The optical system includes an optical element for changing an optical path of the display, such as a lens element, a light guide, or a prism. The display 110 in FIG. 1 is presented in a form of having a greater volume, but the display 110 may also be in a form similar to glasses or other forms.

Opposite sides of the headband module 140 are respectively detachably assembled to an end of each bracket 120 away from the display 110. When the display 110 and the headband module 140 are assembled together, even if a user makes violent movements, the head-mounted display device 100 may still be stably fixed on the head of the user without worrying about falling or even being damaged. In the embodiment, the headband module 140 has, for example, a battery 142 electrically connected to the display 110. The display 110 itself may have a battery, but such a design increases the weight of the display 110. Alternatively, the display 110 may be connected to an external power supply, such as a computer or a power bank, using a cable. However, the cable may affect the operating experience of the user. Under the structure in which the headband module 140 is equipped with the battery 146, the head-mounted display device 100 does not need to be connected to an external power supply, which can prevent limiting the movements of the user when using the head-mounted display device 100. Moreover, such a structure also enables the head-mounted display device 100 to have a more balanced weight on the head of the user to provide preferred operating stability.

In the embodiment, a distance between the opposite sides of the headband module 140 is adjustable. That is, after the display 110 and the headband module 140 are combined, the distance between the opposite sides of the headband module 140 may be adjusted, so that users with different head sizes can comfortably and stably wear the head-mounted display device 100 on their heads.

Figure 2:
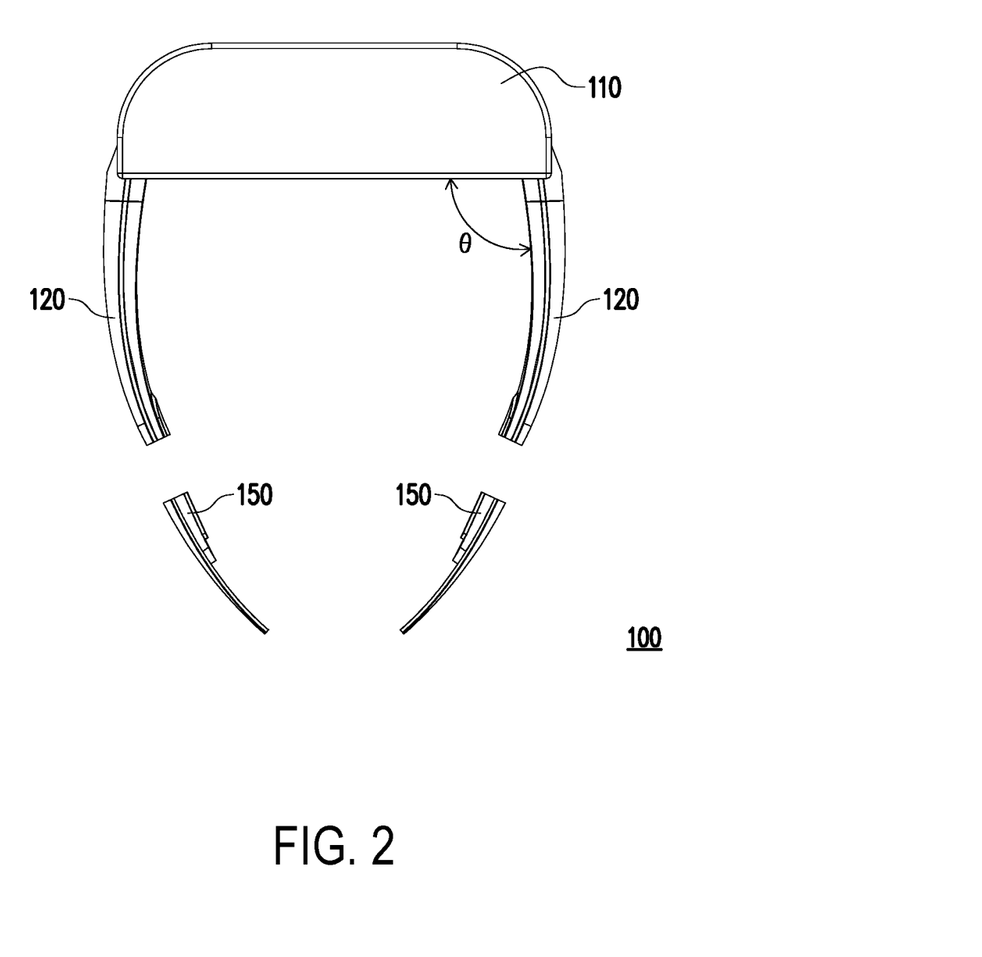
FIG. 2 is a schematic diagram of the head-mounted display device of FIG. 1 in a second state.

FIG. 2 is a schematic diagram of the head-mounted display device of FIG. 1 in a second state. Please refer to FIG. 2. The head-mounted display device 100 of the embodiment may further include two extension members 150 respectively adapted to be detachably assembled to an end of each bracket 120 away from the display 110. That is, the headband module 140 of FIG. 1 may be removed and replaced with the two extension members 150. The two extension members 150 in the embodiment are configured to extend the brackets 120 used as support, so that the head-mounted display device 100 can be more stably supported on the head of the user. In other words, the function of the two extension members 150 is similar to the temples of glasses. When the user watches a video or engage in other static activities, the headband module 140 may be removed to enjoy a lighter usage experience since strong fixation is not required. In other embodiments, the brackets 120 may also be connected to other extended functional elements, so the head-mounted display device 100 has greater convenience in use.

Please refer to FIG. 1 and FIG. 2, it can be found that when the head-mounted display device 100 is in a glasses mode of FIG. 2, in order to provide preferred stability, an unfolding angle θ of each of the two brackets 120 is smaller. On the other hand, when the head-mounted display device 100 is in a headband mode of FIG. 1, in order to connect the headband module 140, the unfolding angle θ of each of the two brackets 120 is greater. Therefore, a switching mechanism needs to be provided such that the unfolding angle θ of the bracket 120 is limited to be greater than a locked angle when in the headband mode of FIG. 1 and the limitation on the unfolding angle θ of the bracket 120 is released in the glasses mode of FIG. 2. Here, the unfolding angle θ is defined as an included angle between the bracket 120 and the display 110.

Below, a connection between a single bracket and a display is taken as an example for illustration. A connection between the other bracket and the other side of the display is the same, so the illustration is omitted. In addition, actions of the two brackets do not need to be synchronized and may be independent.

Figure 3:
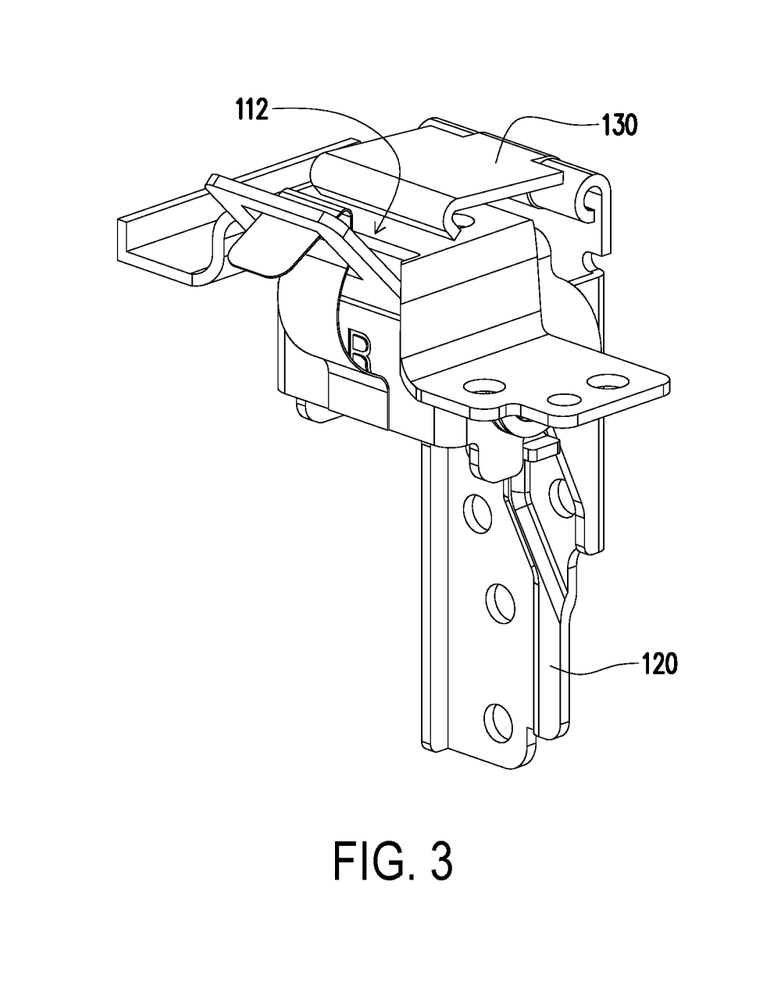
FIG. 3 is a schematic diagram of the head-mounted display device of FIG. 1 at a connection between a bracket and a display.

FIG. 3 is a schematic diagram of the head-mounted display device of FIG. 1 at a connection between a bracket and a display. Please refer to FIG. 1 and FIG. 3. The display 110 has two buckling parts 112 respectively located on the opposite sides of the display 110. The two buckles 130 are respectively pivotally connected to the two brackets 120. In the embodiment, the two buckling parts 112 are buckling grooves, and the two buckles 130 are buckling hooks, but the application is not limited thereto, as long as the buckling parts 112 and the buckles 130 may cooperate with each other.

FIG. 4A to FIG. 4D are schematic diagrams of a mechanism of FIG. 3 in four states. Please refer to FIG. 1 and FIG. 4A. When the buckles 130 are separated from the two buckling parts 112 and are not buckled onto the buckling parts 112, the unfolding angles θ of the bracket 120 are not limited by the buckles 130 and the buckling parts 112. Optionally, in the embodiment, the head-mounted display device 100 may further include two first limiting members 162 and two second limiting members 164. The first limiting member 162 is disposed on the display 110. The second limiting member 164 is disposed on the bracket 120. Using the cooperation of the first limiting member 162 and the second limiting member 164, the unfolding angle θ of the bracket 120 is limited within a certain range. The unfolding angle θ of the bracket 120 is limited to be unable to be smaller than that shown in FIG. 4A, but the unfolding angle θ at this time is still smaller than a locked angle.

Figure 4A:
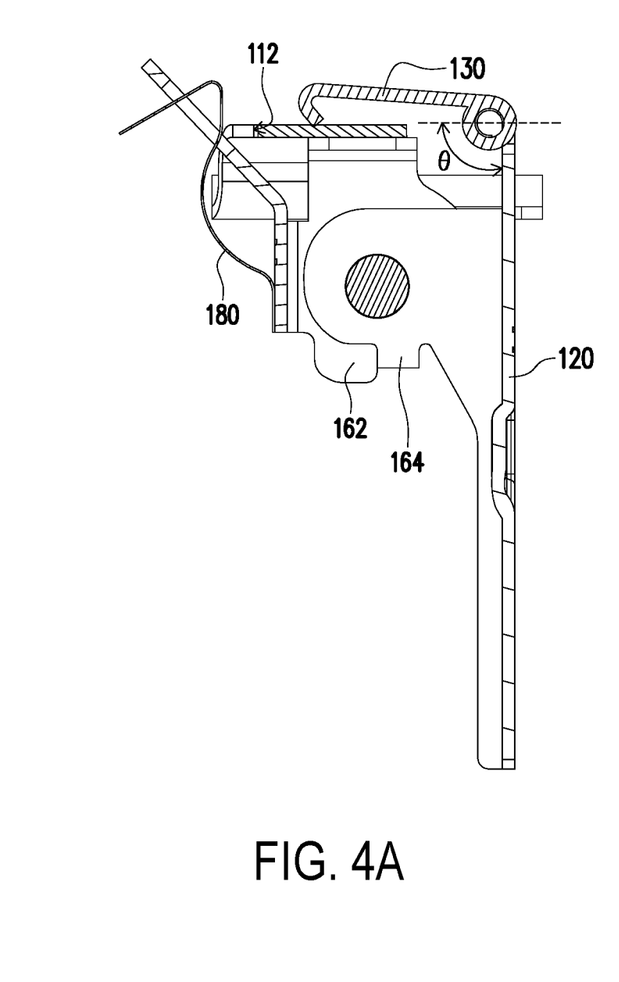
FIG. 4A to FIG. 4D are schematic diagrams of a mechanism of FIG. 3 in four states.
Figure 4B:
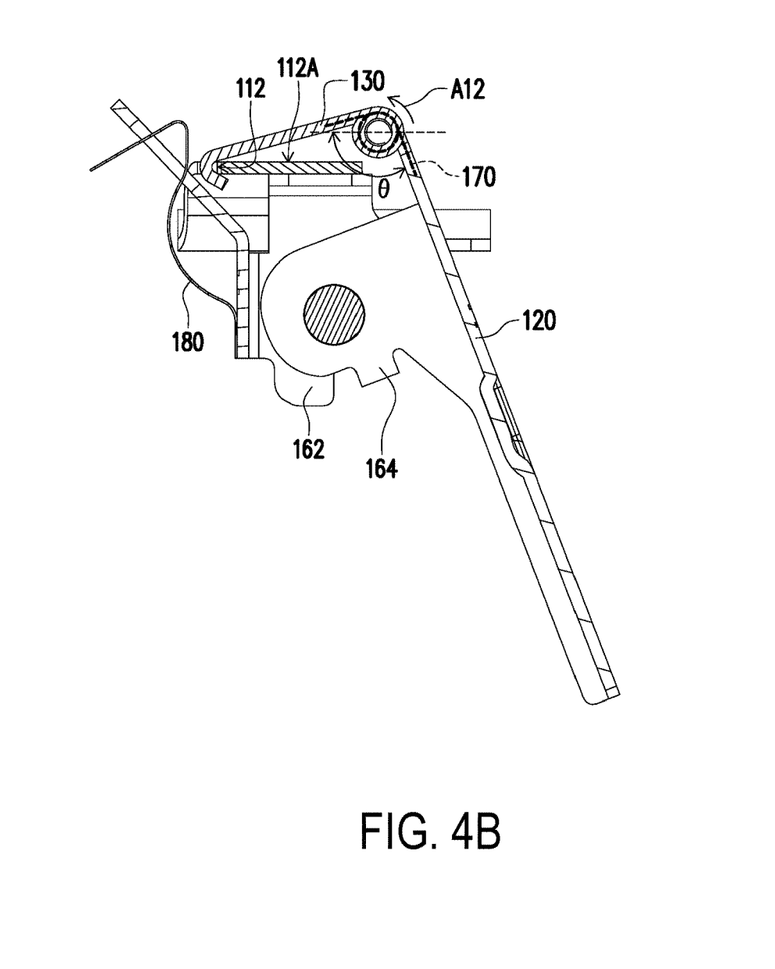

Please refer to FIG. 1 and FIG. 4B. When the bracket 120 is rotated and the unfolding angle θ gradually increases, the buckle 130 is pushed toward the left side of FIG. 4B and is eventually buckled onto the buckling part 112. When the buckle 130 is buckled onto the buckling part 112, the bracket 120 cannot be rotated to shrink the unfolding angle θ due to being restrained by the buckle 130. That is, the unfolding angle θ of the bracket 120 in FIG. 4B is defined as the locked angle, and the unfolding angle θ of the bracket 120 is limited to be only greater than the locked angle. At this time, the head-mounted display device 100 is suitable for use in the headband mode, and the bracket 120 will not continue to exert excessive pressure on the head of the user and the headband module 140.

In the embodiment, the head-mounted display device 100 may further include two springs 170 (only marked in FIG. 4B) disposed between the buckles 130 and the brackets 120. An elastic restoring force of the spring 170 keeps the buckle 130 in contact with a platform surface 112A of the buckling part 112, that is, the buckle 130 has a tendency to rotate toward a counterclockwise direction A12 of FIG. 4B. Therefore, after the buckle 130 is pushed toward the left side of FIG. 4B to the buckling part 112, the buckle 130 is rotated toward the counterclockwise direction of FIG. 4B to be buckled onto the buckling part 112.

In the embodiment, the head-mounted display device 100 may further include two elastic pieces 180 disposed on the opposite sides of the display 110 and adjacent to the two buckling parts 112. When the bracket 120 is rotated such that the unfolding angle θ gradually increases from the size in FIG. 4A, the buckle 130 first contacts the elastic piece 180 and then pushes the elastic piece 180 to the left side of FIG. 4B until the buckle 130 is buckled onto the buckling part 112.

Figure 4C:
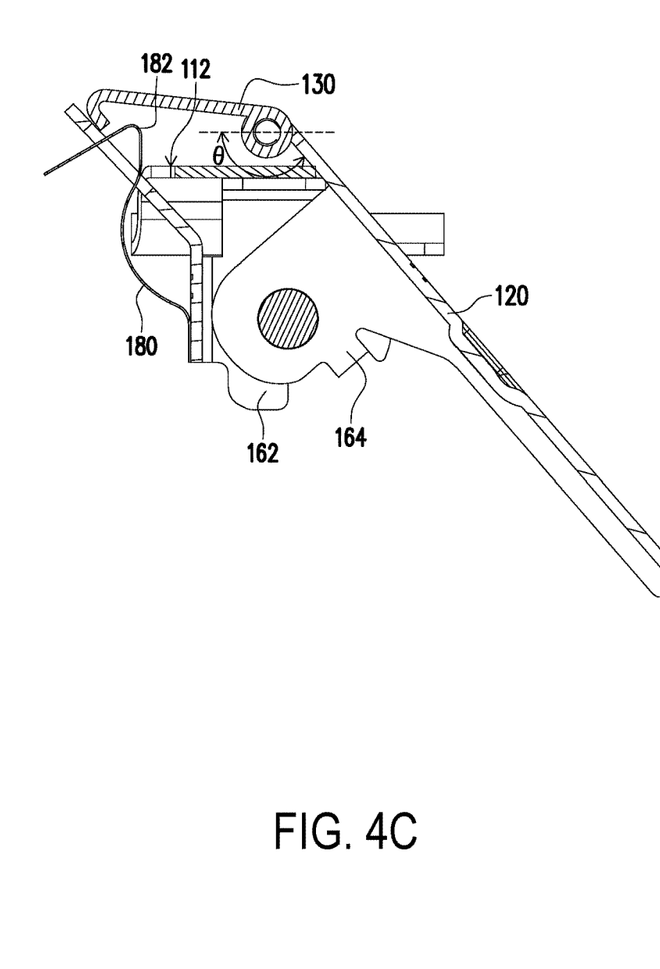

Please refer to FIG. 1 and FIG. 4C. When the bracket 120 is rotated such that the unfolding angle θ increases from the locked angle shown in FIG. 4B toward an unlocked angle, the buckle 130 leaves from a position of being buckled onto the buckling part 112 and pushes the elastic piece 180. When the bracket 120 is rotated and the unfolding angle θ is greater than the unlocked angle shown in FIG. 4C, the buckle 130 is separated from the buckling part 112. Therefore, the bracket 120 may rotate to shrink the unfolding angle θ without being restrained by the buckle 130. The unlocked angle shown in FIG. 4C is greater than the locked angle shown in FIG. 4B. In the embodiment, when the unfolding angle θ increases to the unlocked angle, the buckle 130 passes through a turning section 182 of the elastic piece 180, so the buckle 130 no longer abuts against the elastic piece 180, and the elastic piece 180 may rebound.

Figure 4D:
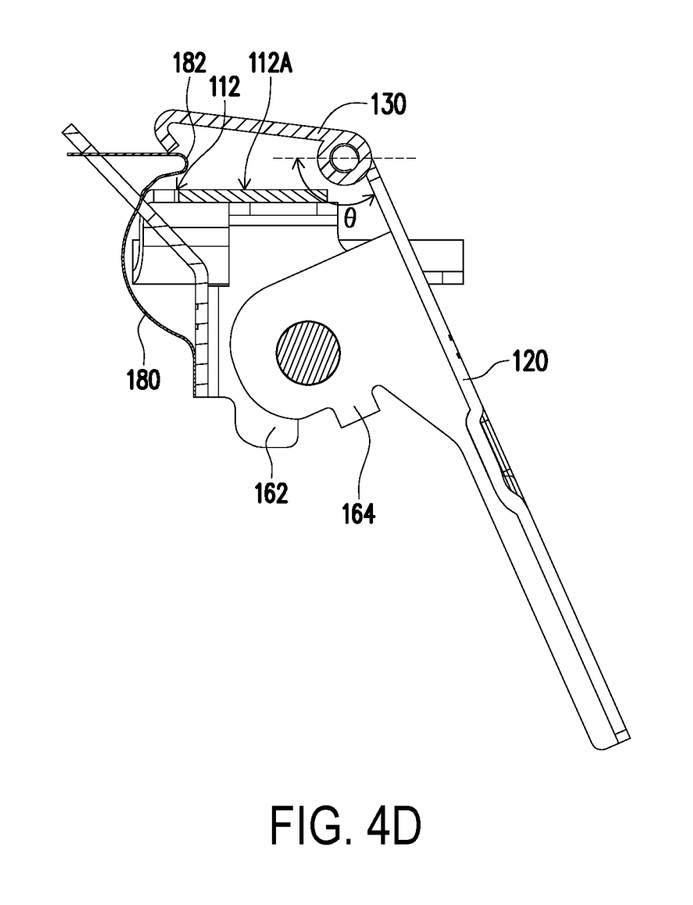

Please refer to FIG. 1 and FIG. 4D. Later, when the bracket 120 is rotated and the unfolding angle θ becomes smaller from the unlocked angle shown in FIG. 4C, the elastic piece 180 is deformed by the pressure exerted by the buckle 130, and the turning section 182 of the elastic piece 180 is close to the buckling part 112 or even exceeds the buckling part 112. Therefore, a distance between the turning section 182 of the elastic piece 180 and the buckling part 112 is not enough for a head part of the buckle 130 to pass through. In addition, the buckle 130 does not exert a pushing force toward the left side of FIG. 4D on the elastic piece 180, so the buckle 130 directly passes over the buckling part 112 after being separated from the elastic piece 180 and cannot be buckled onto the buckling part 112. That is, when the unfolding angle θ of the bracket 120 increases from the state in FIG. 4B to exceed the unlocked angle shown in FIG. 4C, the unfolding angle θ of the bracket 120 may continue shrinking to be smaller than the locked angle after shrinking again from the state in FIG. 4C to the state in FIG. 4D. The user only needs to rotate the bracket 120 such that the unfolding angle θ is greater than the unlocked angle to complete the unlocking. At this time, the head-mounted display device 100 is suitable for use in the glasses mode, the headband module 140 may be removed, and the bracket 120 provides an appropriate supporting force.

Other embodiments will be listed below as illustrations. It must be noted here that the following embodiments continue to use the reference numerals and some content of the foregoing embodiment, wherein the same reference numerals are adopted to represent the same or similar elements, and the description of the same technical content is omitted. For the description of the omitted part, reference may be made to the foregoing embodiment and will not be repeated in the following embodiments.

Figure 5:
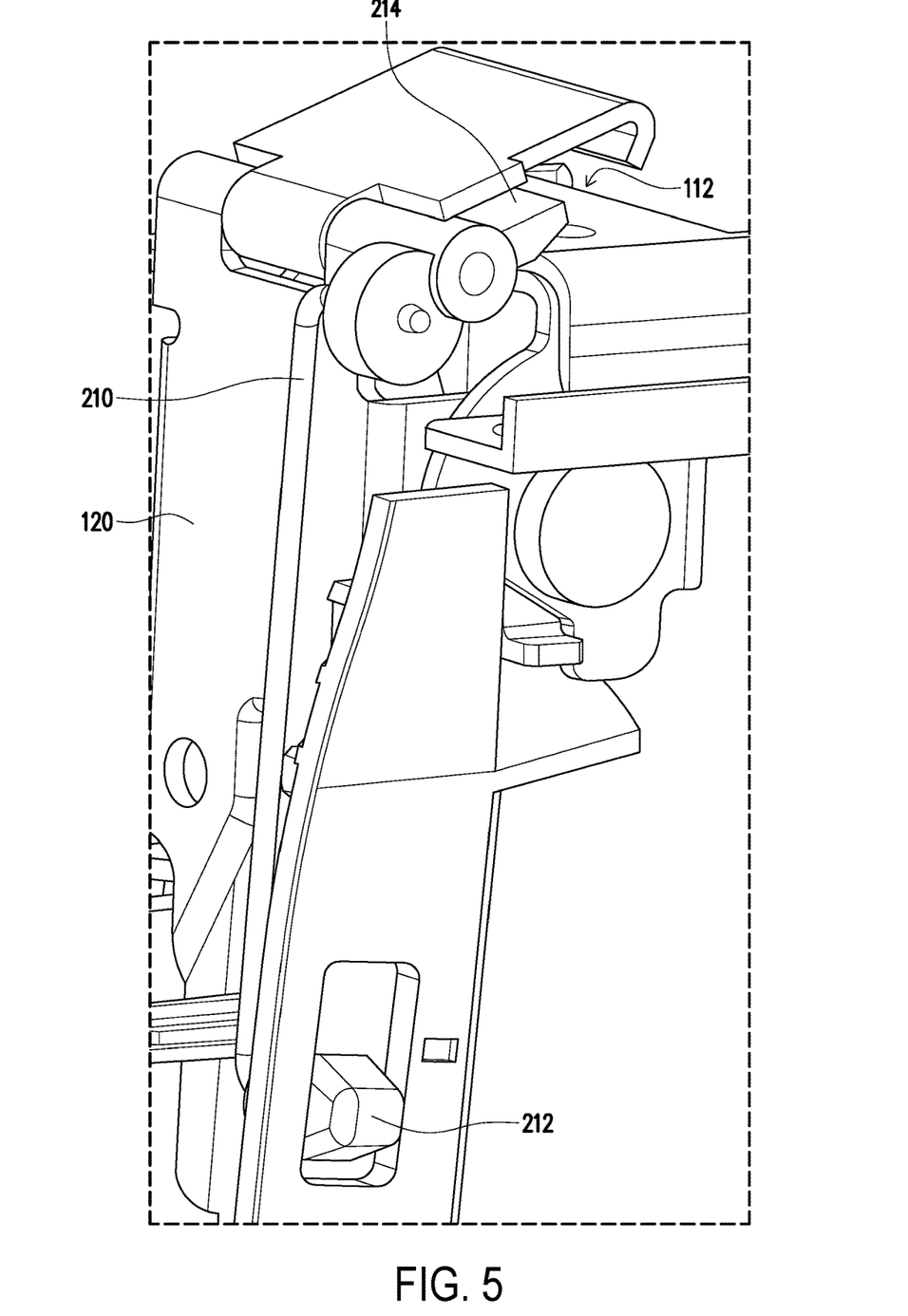
FIG. 5 is a schematic diagram of a head-mounted display device at a connection between a bracket and a display according to another embodiment of the invention.

FIG. 5 is a schematic diagram of a head-mounted display device at a connection between a bracket and a display according to another embodiment of the invention. Please refer to FIG. 5. In the embodiment, the head-mounted display device further includes two pushing rods 210 disposed on the two brackets 120. For example, a protrusion 212 of the pushing rod 210 may be exposed outside the bracket 120, so that the user may push the protrusion 212 to move the pushing rod 210. The pushing rod 210 has a connecting rod 214 on a side away from the protrusion 212, and a middle section of the connecting rod 214 is pivotally connected to the bracket 120. An end of the connecting rod 214 is configured to push against the buckle 130.

FIG. 6A to FIG. 6F are schematic diagrams of a mechanism of FIG. 5 in six states. Please refer to FIG. 6A. At this time, the pushing rod 210 is located at an unlocked position, and the buckle 130 is pushed away from the buckling part 112 by the pushing rod 210. Therefore, no matter how the bracket 120 is rotated, the bracket 120 will not be interfered by the buckle 130.

Figure 6A:
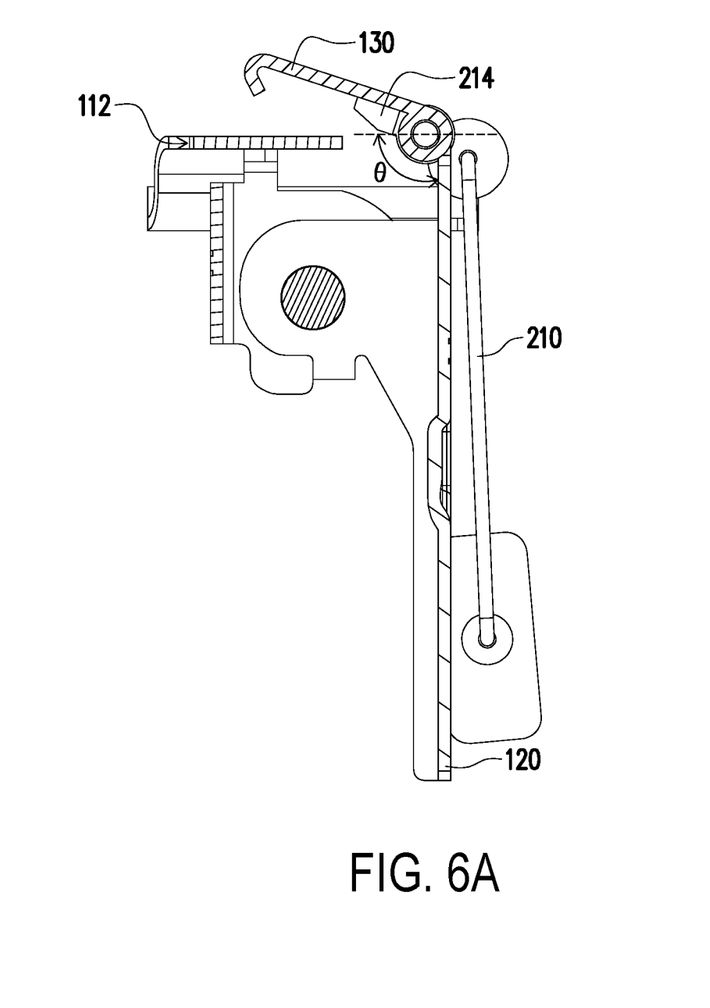
FIG. 6A to FIG. 6F are schematic diagrams of a mechanism of FIG. 5 in six states.
Figure 6B:
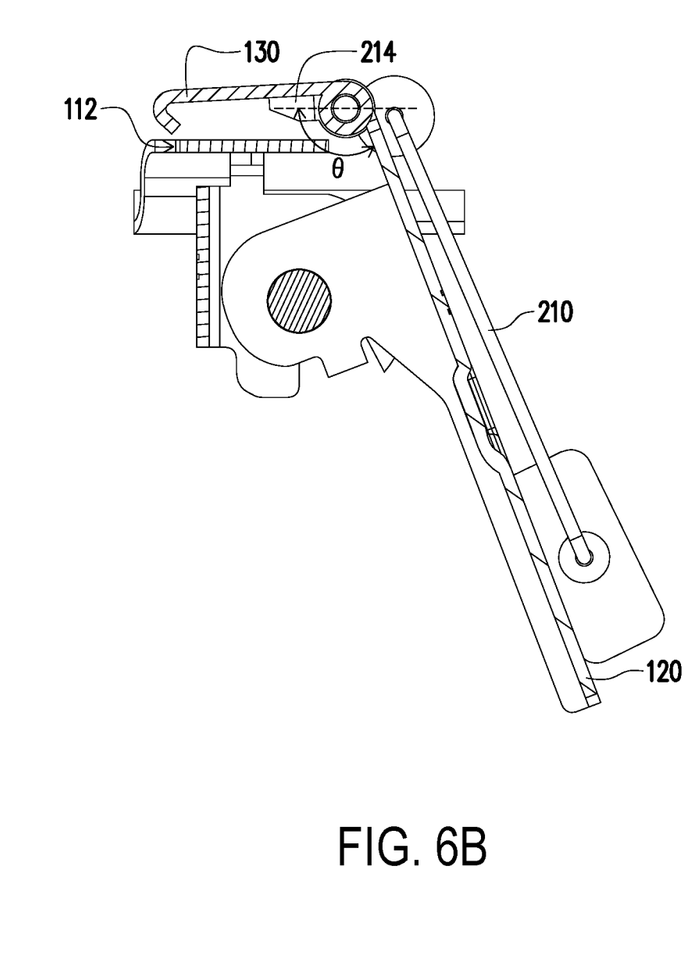

Please refer to FIG. 6B. At this time, although the buckle 130 has reached a position adapted to be buckled onto the buckling part 112, the buckle 130 is pushed by the connecting rod 214 of the pushing rod 210 and cannot be buckled onto the buckling part 112.

Figure 6C:
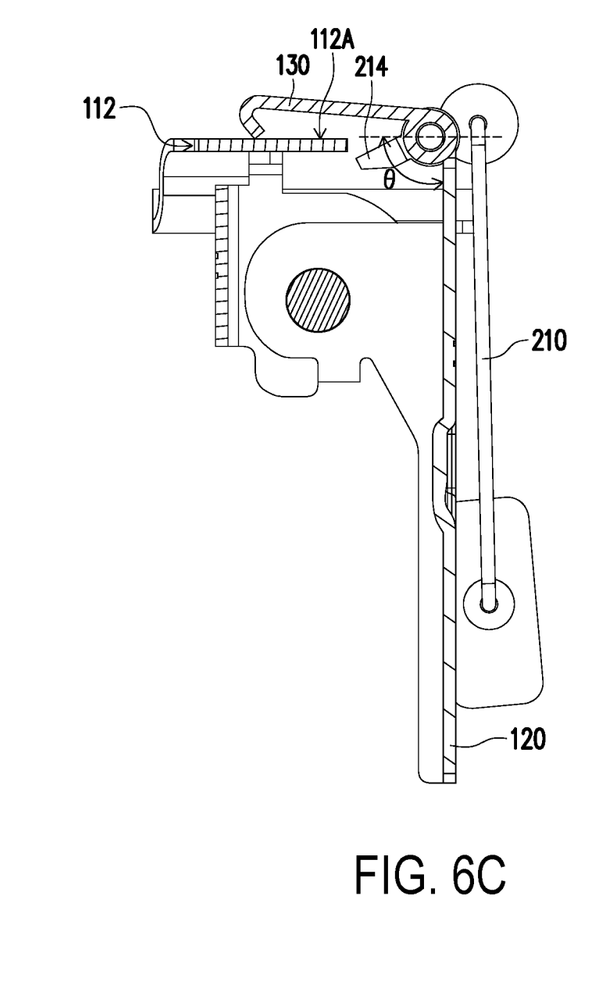

Please refer to FIG. 6C. At this time, the pushing rod 210 is located at a locked position, and the connecting rod 214 of the pushing rod 210 is away from the buckle 130. Therefore, the elastic restoring force of the spring 170 (only shown in FIG. 4B) keeps the buckle 130 in contact with the platform surface 112A of the buckling part 112, that is, the buckle 130 has a tendency to rotate toward a counterclockwise direction of FIG. 6C.

Figure 6D:
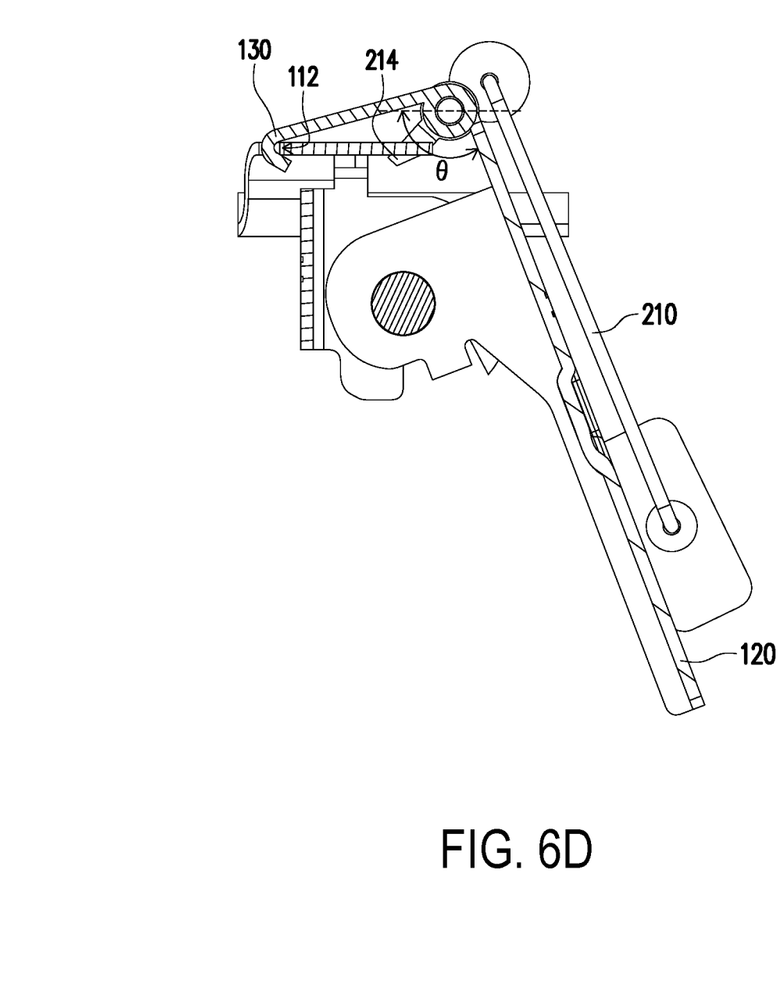

Please refer to FIG. 6D. After the buckle 130 is pushed to position toward the left side of FIG. 6D, the buckle 130 is rotated toward the counterclockwise direction of FIG. 6D and is buckled onto the buckling part 112. When the buckle 130 is buckled onto the buckling part 112, the bracket 120 cannot be rotated to shrink the unfolding angle θ due to being restrained by the buckle 130. That is, the unfolding angle θ of the bracket 120 is limited to be only greater than the locked angle. At this time, the head-mounted display device is suitable for use in the headband mode, and the bracket 120 will not continue to exert excessive pressure on the head of the user and the headband module.

Figure 6E:
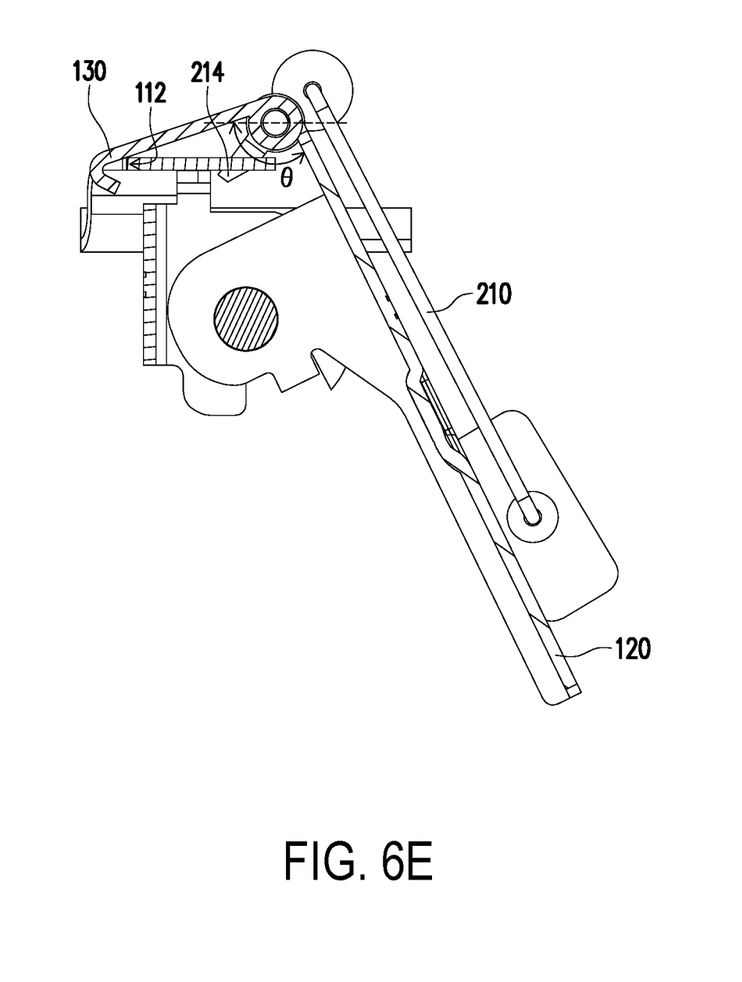

Please refer to FIG. 6E. When the bracket 120 is rotated to increase the unfolding angle θ from the locked angle shown in FIG. 6D to the state in FIG. 6E, the buckle 130 may be separated from the buckling part 112.

Figure 6F:
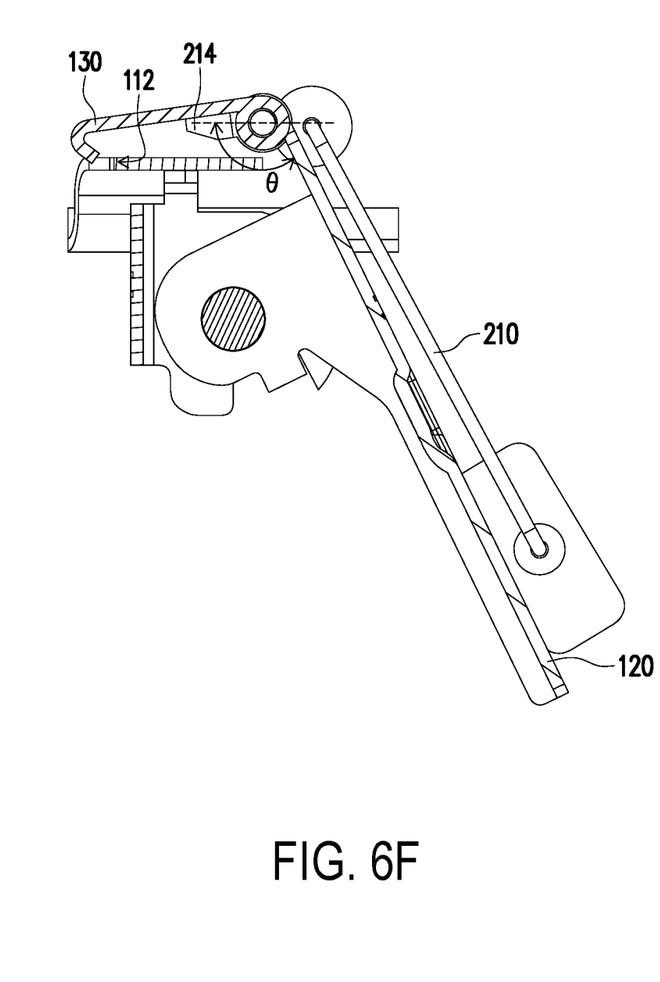

Please refer to FIG. 6F. At this time, the pushing rod 210 is pushed from the locked position in FIG. 6E to the unlocked position in FIG. 6F, and the pushing rod 210 pushes the buckle 130 to rotate toward a direction of separating from the buckling part 112. At this time, the head-mounted display device 100 is suitable for use in the glasses mode, the headband module 140 may be removed, and the bracket 120 provides an appropriate supporting force.

Figure 7:
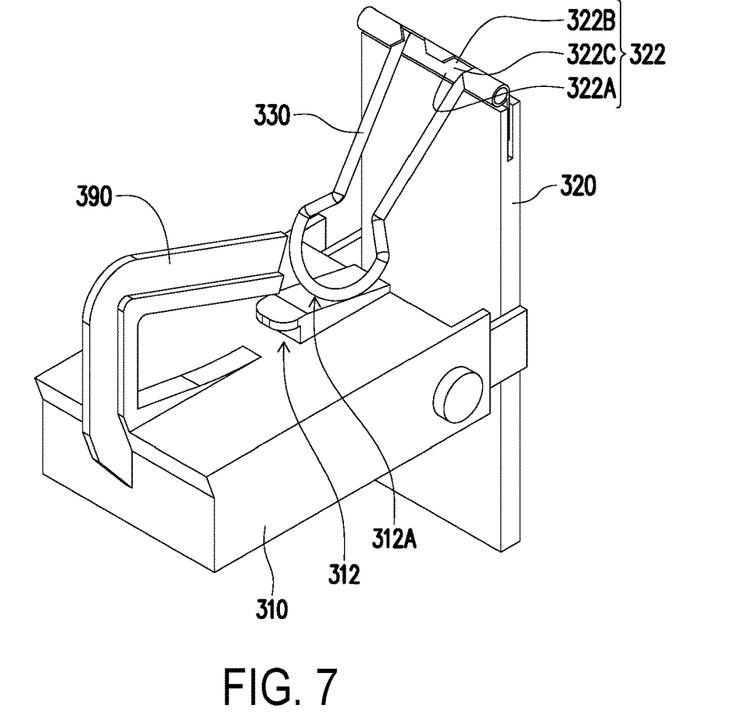
FIG. 7 is a schematic diagram of a head-mounted display device at a connection between a bracket and a display according to yet another embodiment of the invention.

FIG. 7 is a schematic diagram of a head-mounted display device at a connection between a bracket and a display according to yet another embodiment of the invention. In the embodiment, the bracket 320 has a guiding groove 322. The guiding groove 322 has a first section 322A, a second section 322B, and a neck part 322C. The neck part 322C is located between the first section 322A and the second section 322B. A buckle 330 passes through the guiding groove 322. In the embodiment, the head-mounted display device may further include two anti-separation hooks 390 disposed on opposite sides of a display 310 and adjacent to a buckling part 312.

Figure 8A:
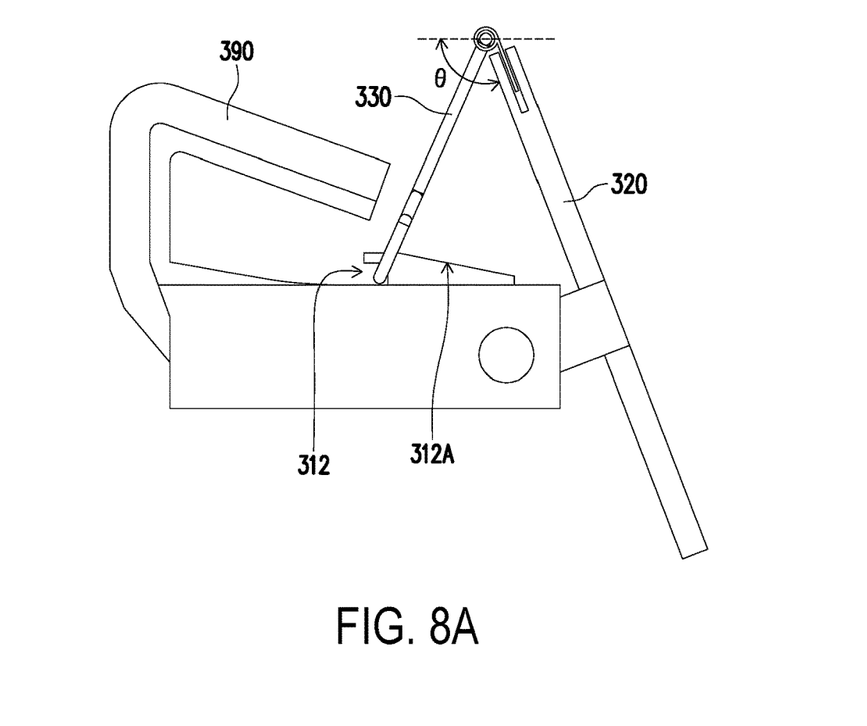
FIG. 8A to FIG. 8C are schematic diagrams of a mechanism of FIG. 7 in three states.
Figure 8B:
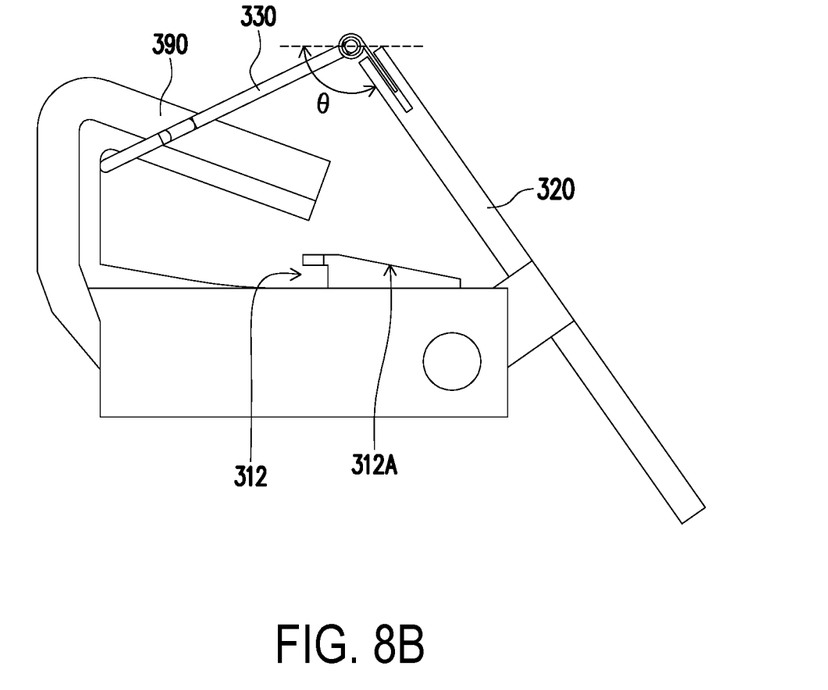
Figure 8C:
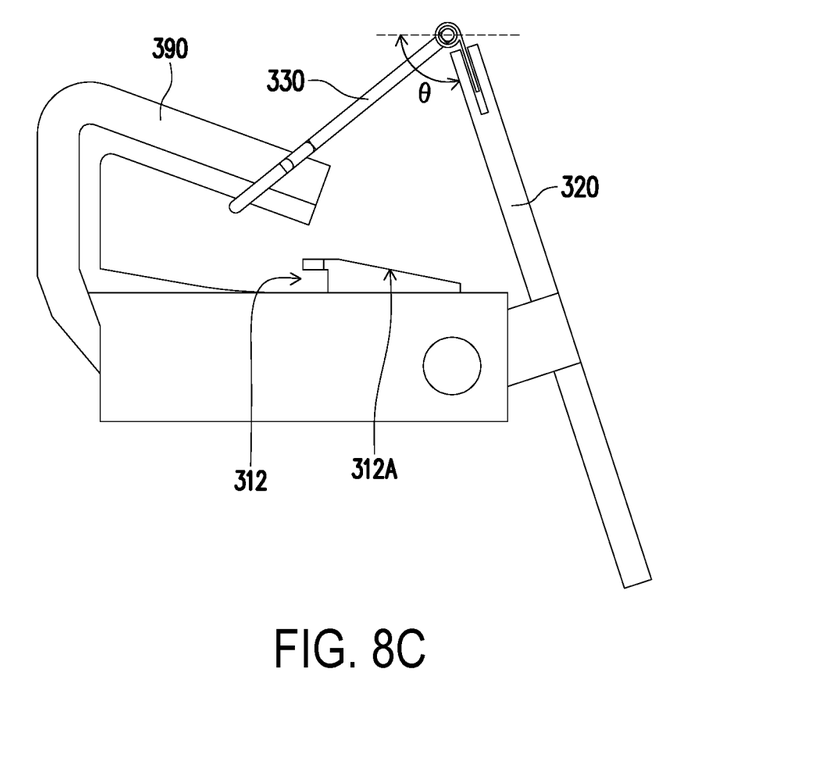

FIG. 8A to FIG. 8C are schematic diagrams of a mechanism of FIG. 7 in three states. Please refer to FIG. 7 and FIG. 8A. When the buckle 330 is located at the first section 322A, the guiding groove 322 exerts force on the buckle 330 to keep the buckle 330 in contact with the display 310. Therefore, during a process of the bracket 320 rotating from the state in FIG. 7 to the state in FIG. 8A, the buckle 330 remains in contact with the display 310 and eventually exceeds the position of the buckling part 312. Then, when the bracket 320 is rotated toward a clockwise direction of FIG. 8A, the buckle 330 soon enters the buckling part 312 to be buckled onto the buckling part 312. At this time, the bracket 120 cannot continue to rotate toward the clockwise direction of FIG. 8A, that is, the unfolding angle θ cannot continue to shrink due to being restrained by the buckle 330. That is, the unfolding angle θ of the bracket 320 in FIG. 8A is defined as the locked angle, and the unfolding angle θ of the bracket 320 is limited to be only greater than the locked angle. At this time, the head-mounted display device is suitable for use in the headband mode, and the bracket 120 will not continue to exert excessive pressure on the head of the user and the headband module.

Please refer to FIG. 7 and FIG. 8B. The bracket 320 is rotated toward a counterclockwise direction of FIG. 8B, the buckle 330 leaves the buckling part 312, and the buckle 330 also moves from the first section 322A of the guiding groove 322 toward the neck part 322C. When the buckle 330 is located at the neck part 322C, the unfolding angle θ of the bracket 320 is equal to the unlocked angle. When the unfolding angle θ of the bracket 320 continues to increase and exceeds the unlocked angle, the buckle 330 also crosses the neck part 322C to enter the second section 322B. When the buckle 330 is located at the second section 322B, the guiding groove 322 exerts force on the buckle 330, so that the buckle 330 tends to move away from the display 310. Therefore, the buckle 330 is rotated clockwise as shown in FIG. 8B and abuts upward against the anti-separation hook 390.

Please refer to FIG. 7 and FIG. 8C. The bracket 320 is rotated toward the clockwise direction of FIG. 8C, and the unfolding angle θ of the bracket 320 becomes smaller toward the unlocked angle. At the same time, the anti-separation hook 390 exerts force to move the buckle 330 from the second section 322B toward the neck part 322C, that is, the buckle 330 is rotated toward the counterclockwise direction of FIG. 8C. After the buckle 330 crosses the neck part 322C to enter the first section 322A, the buckle 330 shows the tendency to remain in contact with a platform part 312A of the buckling part 312 again. However, since a front end of the buckle 330 has passed above the buckling part 312 and is located on a right side of the buckling part 312 in FIG. 8C, the buckle 330 is not buckled onto the buckling part 312, and the unfolding angle θ of the bracket 320 may continue to shrink to be smaller than the locked angle. At this time, the head-mounted display device is suitable for use in the glasses mode, the headband module may be removed, and the bracket 320 provides an appropriate supporting force.

In summary, in the head-mounted display device of the application, the unfolding angle of the bracket may be limited and cannot be too small to prevent the bracket from continuously exerting excessive pressure on the head of the user and the headband module, which is suitable for use in the headband mode. In addition, the lock may be released by simply unfolding the bracket, so that the bracket may provide an appropriate supporting force, which is suitable for using the head-mounted display device in the glasses mode.

What is claimed is:

1. A head-mounted display device, comprising:
   a display, having two buckling parts respectively located on opposite sides of the display;
   two brackets, respectively pivotally connected to the opposite sides of the display;
   two buckles, respectively pivotally connected to the two brackets, wherein when the two buckles are buckled onto the two buckling parts, an unfolding angle of each of the two brackets is limited to be greater than a locked angle, when the unfolding angle of each of the two brackets is greater than an unlocked angle, the two buckles are separated from the two buckling parts, the unlocked angle is greater than the locked angle, when the two buckles are separated from the two buckling parts, the unfolding angle of each of the two brackets is smaller than the locked angle; and
   a headband module, having opposite sides respectively detachably assembled to an end of each of the brackets away from the display.

2. The head-mounted display device according to claim 1, wherein the two buckling parts are buckling grooves, and the two buckles are buckling hooks.

3. The head-mounted display device according to claim 2, further comprising two springs disposed between the two buckles and the two brackets, wherein an elastic restoring force of the two springs keeps the two buckles in contact with the display.

4. The head-mounted display device according to claim 2, further comprising two elastic pieces disposed on opposite sides of the display and adjacent to the two buckling parts, wherein when the two brackets are rotated such that the unfolding angle increases from the locked angle toward the unlocked angle, the two buckles leave from positions of being buckled onto the two buckling parts and push the two elastic pieces, when the unfolding angle increases to the unlocked angle, the two buckles respectively passes through a turning section of each of the elastic pieces, and the two elastic pieces rebound, so that the two buckles are not buckled onto the two buckling parts when the unfolding angle becomes smaller from the unlocked angle.

5. The head-mounted display device according to claim 2, wherein each of the brackets has a guiding groove, the guiding groove has a first section, a second section, and a neck part, the neck part is located between the first section and the second section, the two buckles pass through the guiding grooves, when the two buckles are located at the first sections, the guiding grooves exert force on the two buckles to keep the two buckles in contact with the display, when the two buckles are located at the second sections, the guiding grooves exert force on the two buckles to move the two buckles away from the display, when the two buckles are located at the neck parts, the unfolding angle of each of the two brackets is equal to the unlocked angle.

6. The head-mounted display device according to claim 5, further comprising two anti-separation hooks disposed on opposite sides of the display and adjacent to the two buckling parts, wherein when the unfolding angle of each of the two brackets becomes smaller toward the unlocked angle, the two anti-separation hooks exert force to move the two buckles from the second sections toward the neck parts.

7. The head-mounted display device according to claim 2, further comprising two pushing rods disposed on the two brackets, wherein when the two pushing rods are pushed from a locked position to an unlocked position, the two buckles are pushed to rotate toward a direction of being separated from the two buckling parts.

8. The head-mounted display device according to claim 1, wherein the headband module has a battery electrically connected to the display.

9. The head-mounted display device according to claim 1, wherein a distance between the opposite sides of the headband module is adjustable.

10. The head-mounted display device according to claim 1, further comprising two extension members respectively adapted to be detachably assembled to the end of each of the brackets away from the display.

* * * * *